United States Patent [19]

Vander Kaay et al.

[11] Patent Number: 4,485,844
[45] Date of Patent: Dec. 4, 1984

[54] BACK PRESSURE INDUCER

[75] Inventors: Henry A. Vander Kaay, Ann Arbor, Mich.; Borje O. Rosaen, 4031 Thornoaks, Ann Arbor, Mich. 48104

[73] Assignees: Borje O. Rosaen; Rosedale Product, Inc., both of Ann Arbor, Mich.

[21] Appl. No.: 371,068

[22] Filed: Apr. 23, 1982

[51] Int. Cl.³ .................. F16K 15/06; F16K 17/04
[52] U.S. Cl. .................. 137/515.7; 137/536; 137/540; 137/543.13; 137/543.15; 251/333
[58] Field of Search ............ 137/540, 543.13, 543.15, 137/536, 514.3, 515.7; 251/333

[56] References Cited

U.S. PATENT DOCUMENTS

| | | | |
|---|---|---|---|
| 1,385,932 | 7/1921 | Stayman | 137/514.3 |
| 2,197,148 | 4/1940 | Hasbrouck | 137/514.3 |
| 2,809,660 | 10/1957 | Becker | 137/514.3 |
| 2,943,639 | 7/1960 | Smith | 137/515.7 |
| 3,661,175 | 5/1972 | Tillman | 137/537 |
| 4,350,179 | 9/1982 | Bunn et al. | 137/540 |

Primary Examiner—Martin P. Schwadron
Assistant Examiner—Mark Malkin
Attorney, Agent, or Firm—Gifford, VanOphem, Sheridan, Sprinkle & Nabonzy

[57] ABSTRACT

A back pressure inducer and check valve is disclosed for use with a fluid system having inlet passageway, an outlet passageway and in which fluid flows from the inlet and to the outlet passageway. The back pressure inducer comprises a valve seat secured to the system and having a fluid port fluidly between the inlet and outlet passageways. A valve member is movable between a closed and open position to variably open the fluid port while a spring urges the valve member towards its closed position. Cooperating conical surfaces on the valve member and valve seat form an annular passageway when the valve member is in its open position to produce controlled pressure drops between the inlet and outlet conduit over a wide range of fluid flow rates.

11 Claims, 4 Drawing Figures

BACK PRESSURE INDUCER

BACKGROUND OF THE INVENTION

I. Field of the Invention

The present invention relates to a back pressure inducer for use in a fluid system.

II. Description of the Prior Art

Back pressure inducers are commonly used in fluid systems in order to impose a resistance, i.e., create a pressure drop, to the fluid flow from one passageway or conduit to another. Such back pressure inducers are used in a plurality of different applications in fluid systems.

These previously known back pressure inducers typically comprise a flat plate having a circular hole and positioned in between the conduits so that the hole forms a fluid port between the conduits. A poppet valve member having an outwardly flared or conical valve head and an elongated stem extending axially away from the valve head is then positioned within the outlet conduit and so that the valve head registers with the fluid port. A spring retainer is also positioned within the outlet conduit around the stem of the valve member while a helical spring extends between the spring retainer and the valve head to urge the valve member towards its closed position. Fluid flow from the inlet conduit to the outlet conduit greater than a predetermined pressure forces the valve member open and enables fluid flow from the inlet conduit and to the outlet conduit while simultaneously creating the desired pressure drop.

These previously known back pressure inducers, however, are disadvantageous in that they impose an excessive resistance to the fluid at high fluid flow rates. Such excessive resistance creates an excessive and undesired pressure drop across the back pressure inducer at high fluid flow rates. The reasons for such excessive pressure drops at high flow rates are essentially two fold.

First, the use of a flat plate with a hole formed through it as the valve seat in combination with the conical head of the valve member produces deceleration, swirling and reacceleration of fluid flow passing through the fluid port and around the valve member head. Such turbulence in the fluid flow increases proportionately with the rate of fluid flow thus proportionally increasing the pressure drop across the back pressure inducer.

Secondly, the helical spring positioned around the stem of the valve member restricts the fluid passageway of the fluid after the fluid has passed around the head of the valve member. The fluid restriction caused by the helical spring and its retaining structure in this position further increases the pressure drop across the back pressure inducer proportionally with the fluid flow rate.

SUMMARY OF THE PRESENT INVENTION

The present invention discloses a back pressure inducer which overcomes all of the above-mentioned disadvantages of the previously known back pressure inducers and which is capable of creating a controlled and, if desired, a relatively constant pressure drop over a wide range of fluid flow rates.

In brief, the back pressure inducer according to the present invention comprises a valve seat which is mechanically secured into a system so that a passage fluidly is formed through the valve seat which establishes fluid communication between the inlet and outlet conduits. The valve seat also includes a surface which flares outwardly from the fluid port and towards the outlet conduit and, in the preferred form of the invention, is substantially frusto-conical in shape.

The back pressure inducer further comprises a poppet valve having an enlarged head and an elongated stem secured to and extending downstream from the valve head. An outwardly flared and preferably conical surface is formed on the valve head so that this valve member surface flares outwardly from the fluid port.

The valve member is movable between a closed position and an open position. In the closed position, the outwardly flared surfaces on both the valve seat and the valve head abut so that the valve member substantially closes the fluid port. Conversly, in its open position, the valve member is spaced downstream from the fluid port thus forming an annular flow passageway between the outwardly flared surfaces of both the valve seat and valve member. Unlike the previously known back pressure inducers, the area of this annular flow passage is substantially constant along the annular flow passage. The cooperating outwardly flared surfaces formed on the valve seat and valve head thus cause fluid velocity to be held substantially constant preventing unnecessary deceleration and subsequent reacceleration of the fluid flow through the fluid port and annular flow passage.

Resilient means, such as a helical spring, are used to urge the valve member toward its closed position. In the preferred form of the invention, the helical spring is contained within an axial recess formed in the poppet valve stem so that one end of the spring abuts against the end of the recess adjacent the valve member head. A spring retainer is slidably mounted within the axial recess and abuts against the other end of the spring. An elongated rod is then secured to the spring retainer and extends axially through the recess and a bore formed in the poppet valve head so that a portion of the rod is positioned upstream from the fluid port. An anchor is secured to the valve seat upstream from the fluid port in an area of relatively low fluid velocity and the rod is secured to the anchor.

Since the helical spring is contained within the poppet valve stem and thus outside the fluid flow across the poppet valve stem, the spring does not restrict the fluid flow across the valve stem.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
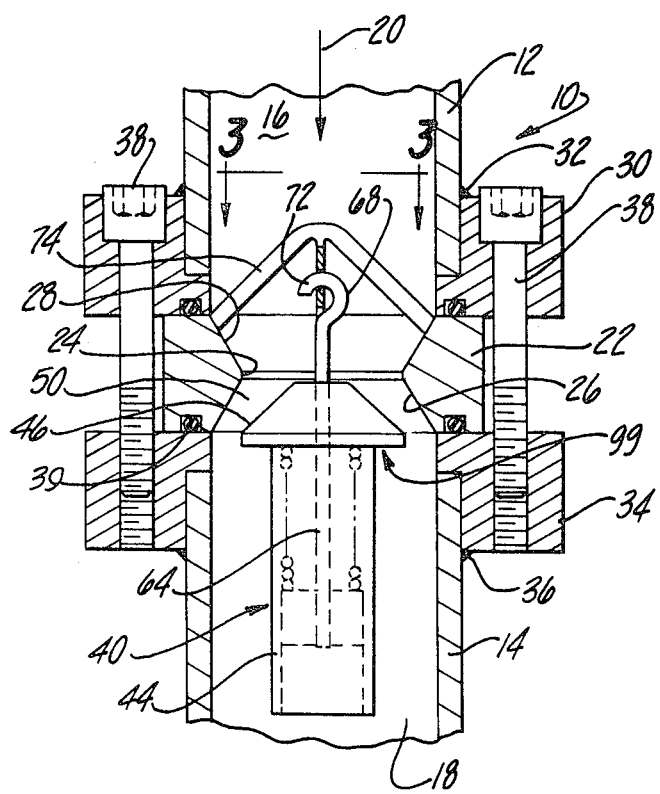
FIG. 1 is a fragmentary cross sectional view illustrating a first preferred embodiment of the back pressure inducer of the present invention and showing the valve member in an open position.

With reference first to FIG. 1, a preferred embodiment of the back pressure inducer according to the present invention is thereshown installed in a fluid system 10 having an inlet conduit 12 and an outlet conduit 14. The inlet conduit 12 forms an inlet fluid passageway 16 and, similarly, the outlet conduit 14 forms an outlet fluid passageway 18. As will become shortly apparent, fluid flows in the direction of arrow 20 and thus from the inlet passageway 16 and to the outlet passageway 18.

Although the conduits 12 and 14 are illustrated in FIG. 1 as pipe sections, it will, of course, be understood that the conduits 12 and 14 are shown by way of illustration only. The back pressure inducer according to the present invention can be employed to resist fluid flow between any two fluid passageways. Consequently, the terms inlet conduit 12 and outlet conduit 14 shall mean any fluid system defining a fluid passageway in through which fluid flows.

Still referring to FIG. 1, the back pressure inducer according to the present invention comprises an annular valve seat 22 which defines a circular fluid port 24 so that the fluid port 24 is fluidly positioned in between the inlet and outlet passageways 16 and 18, respectively. In addition, the valve seat 22 includes an outwardly flared and preferably conical surface 26 which flares outwardly from the fluid port 24 and toward the outlet passageway 18 for a reason to be shortly described. Similarly, in one form of the invention, an outwardly flared and preferably conical surface 28 flares outwardly from the fluid port 24 and towards the inlet passageway 16.

Although the valve seat 22 can be secured in between the inlet conduit 12 and outlet conduit 14 in any conventional fashion, as shown in FIG. 1, a mounting flange 30 is secured by welds 32 to the end of the inlet conduit 12 while a similar mounting flange 34 is secured by welds 36 to the end of the outlet conduit 14. The valve seat 22 is sandwiched in between these mounting flanges 30 and 34 so that the valve seat 22 and conduits 12 and 14 are axially aligned with each other. Bolts 38 are then used to secure the mounting flanges 30 and 34 together thus securing the valve seat 22 in between the conduits 12 and 14. Appropriate fluid seals 39 are preferably used to form a fluid tight fit between the valve seat 22 and the mounting flanges 30 and 34.

Figure 2:
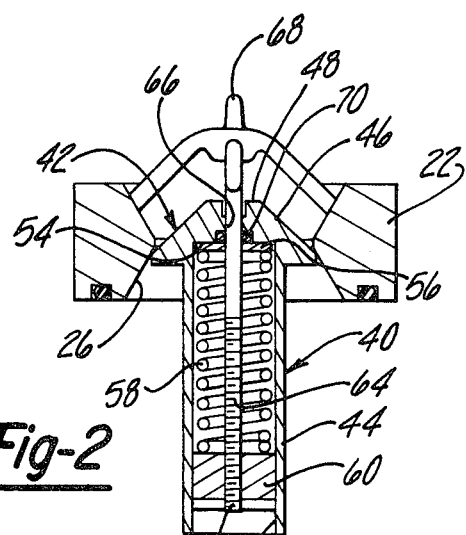
FIG. 2 is a cross sectional view illustrating a preferred embodiment of the back pressure inducer of the present invention and showing the valve member in its closed position.

With reference now to FIGS. 1 and 2, the back pressure inducer further comprises a poppet valve member 40 having an enlarged diameter valve head 42 and an elongated and generally cylindrical stem 44 which extends axially downstream from the valve head 42. Preferably, the valve head 42 and valve stem 44 are of a one-piece construction.

The valve head 42 includes a surface 46 which flares outwardly from one end 48 of the valve head 42 and fluidly downstream or towards the valve stem 44. Consequently, the outwardly flared or frusto-conical surface 46 of the valve head 42 tapers outwardly in the same direction as the outwardly flared surface 26 on the valve seat 22. The larger diameter end of the valve head 42 is greater in diameter than the valve stem 44 for a reason to be subsequently described.

The poppet valve 40 is movable between an open position, shown in FIG. 1, and a closed position, shown in FIG. 2. In its closed position, the valve head surface 46 abuts against its cooperating surface 26 on the valve seat 22 and thus substantially closes the fluid port 24. Conversely, in its open position, the poppet valve 40 shifts downstream and forms an annular fluid passageway 50 (FIG. 1) between the valve head conical surface 46 on the valve seat conical surface 26. The area of this annular fluid passageway 50 is substantially constant from the fluid port 24 and across the valve head 42.

With reference particularly to FIG. 2, the back pressure inducer further includes means for urging the valve member 40 towards its closed position. In the preferred form of the invention, an axial recess 52 is formed in the valve member stem 44 so that the recess 52 terminates at an end 54 adjacent the valve head 42. A seal retainer 56 is positioned at the end 54 of the recess 52 and a helical compression spring 58 is positioned within the recess 52 so that the upper end (as shown in FIG. 2) of the spring 58 abuts against the seal retainer 56.

A spring retainer 60 is axially slidably positioned within the open or downstream end of the recess 52 so that the spring retainer 60 abuts against the end of the spring 58 most spaced from the valve head 42. One end 62 of an elongated rod 64 is threadably secured at one end to the spring retainer 60. The rod 64 extends axially through the valve member stem 44 and through an axial bore 66 in the valve member head 42 so that the other end 68 of the rod 64 is positioned upstream from the fluid port 24. An appropriate fluid seal 70 is preferably positioned between the bore 66 and rod 64 to prevent fluid leakage along the rod 64.

Figure 3:
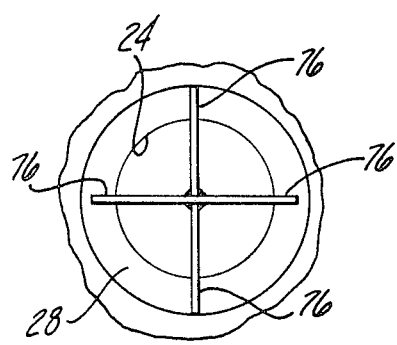
FIG. 3 is a view taken substantially along line 3—3 in FIG. 1.

With reference again to FIGS. 1 and 2, the upstream end 68 of the rod 64 is formed into a hook 72 and is attached to an anchor 74 which is positioned upstream from the fluid port 24. The anchor 74 is stationary relative to the valve seat 22 and, as best shown in FIGS. 1 and 3, comprises a cruciform having four legs 76 which abut against the inlet side of the valve seat 22. The anchor 74, of course, can take other forms without deviating from the scope or spirit of the present invention.

In operation, the helical spring 58 is in a state of compression and thus urges the valve head against the valve seat 22 as shown in FIG. 2. When the pressure in the inlet passageway 16 exceeds a predetermined amount, however, the fluid pressure forces the valve member 40 downstream, as shown in FIG. 1, against the force of and compressing the helical spring 58 thus permitting fluid to flow through the fluid port 24, annular fluid passageway 50 and to the outlet passageway 18 around the valve member 40. The helical spring 58 controls the opening pressure of the valve member 40 and this opening pressure can be adjusted by adjusting the threaded connection between the second spring retainer 60 and the threaded rod 64.

With the valve member 40 in its fully open position, as shown in FIG. 1, the annular fluid passageway 50 has a substantially constant area from the fluid port 24 and along the annular fluid passageway 50. Consequently, fluid velocity through the passageway 50 will be substantially constant at all fluid flow rates. Thus, the construction of the cooperating outwardly flared surfaces 46 and 26 of the valve head 42 and valve seat 22, respectively, creates a minimum pressure drop across the back pressure inducer of the present invention.

The present invention further achieves a relatively low and constant pressure drop across the back pressure inducer over a wide range of fluid flow rates by containing the helical spring 58 within the stem recess 52 so that the helical spring 58 does not further restrict the flow passage between the valve stem 44 and the conduit 14. Such restriction would otherwise cause undesirable resistance especially at high fluid flow rates. Furthermore, since the anchor 74 is positioned upstream from the fluid port 20 and, thus, in an area of relatively low fluid velocity, the anchor 74 likewise does not significantly restrict fluid flow through the back pressure inducer again creating a relatively constant pressure drop across the pressure inducer over a wide range of fluid flow rates.

As previously described, in the preferred form of the invention, the larger diameter end of the valve head 42 is greater than the diameter of the valve stem 40 so that relatively high fluid flow rates create a relatively lower pressure in region 99 (FIG. 1) after the fluid flow passes entirely through the annular passageway 50 and over the valve head 42. This pressure being lower than pressure against 46 creates a force on the valve member 40 opposite from the force of the spring 58 thus urging the valve member 40 towards a more open position and further reducing the pressure drop across the back pressure inducer at high fluid flow rates.

Figure 4:
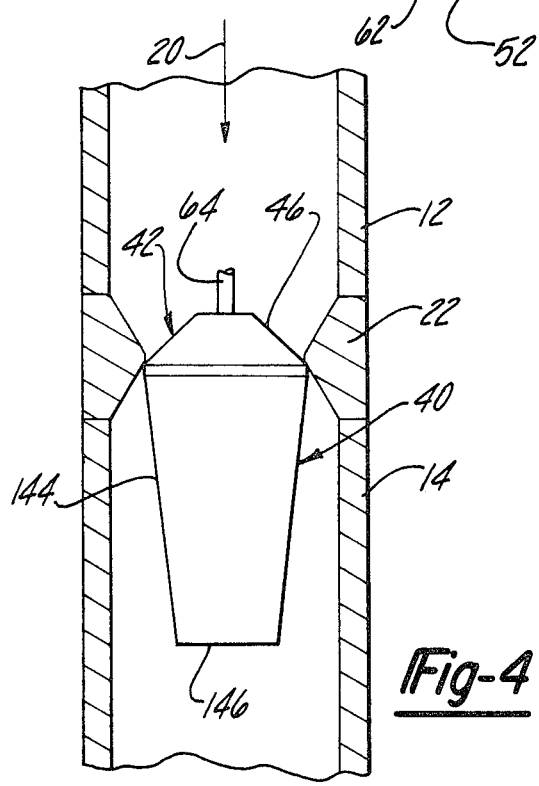
FIG. 4 is a fragmentary partial sectional view illustrating a second preferred embodiment of the invention.

With reference now to FIG. 4, a second preferred embodiment of the present invention is thereshown in which the valve stem 44 of the FIGS. 1 and 2 embodiment is replaced by a frusto-conical stem 144 which gradually reduces in diameter from the valve head 42 and to the downstream end 146 of the valve member 40. The valve member 40 illustrated in FIG. 4 is useful in applications where a controlled increase in the pressure drop is desired as the flow rate through the inlet and outlet conduits 12 and 14 increase. Such a controlled increase of the pressure drop is achieved by the design of the valve member shown in FIG. 4 since much less pressure difference is created which acts against the force of the spring 58.

Still other designs and configurations for the valve member 40 can be employed in order to tailor the pressure drop versus the fluid flow rate for a particular fluid system application.

The construction of the valve seat 22 as having a conical surface extending outwardly from each side of the port 24 is also advantageous in that the valve member 40 can be installed on either side of the valve seat 22.

From the foregoing, it can be seen that the back pressure inducer according to the present invention overcomes the disadvantages of the previously known back pressure inducers by providing a controlled and, if desired, relatively constant pressure drop over a wide range of fluid flow rates.

Having described my invention, however, many modifications thereto will become apparent to those skilled in the art to which it pertains without deviation from the spirit of the invention as defined by the scope of the appended claims.

I claim:

1. A back pressure inducer for use with a pair of coaxial fluid conduits one fluid conduit having an internal bore which forms an inlet passageway and the other conduit having an internal bore which forms an output passageway, said back pressure inducer comprising:
   a valve seat having a fluid port and a surface which flares outwardly from said port and towards the outlet passageway,
   means for securing said valve seat in line between the inlet and outlet passageways so that said fluid port is fluidly connected between the inlet and outlet passageways,
   a valve member having an outwardly flared surface, said valve member being movable between a closed position in which said valve member abuts against said valve seat and at least substantially closes said fluid port and an open position in which said valve member flared surface is spaced from said valve seat flared surface thus fluidly opening said ports,
   at least a portion of said valve member being positioned within said other conduit, said valve member portion being spaced inwardly from said internal bore of said other conduit,
   means for urging said valve member towards said closed position and
   wherein said valve member comprises an enlarged head and wherein said valve seat and said valve member head are frusto-conical in shape, said valve seat and said valve member head being formed with different angles of inclination, the relationship of the angles being such that the area of opening between said valve member head and between said valve seat remains substantially constant along said valve member head when said valve member is in its fully open position.

2. The invention as defined in claim 1 wherein said urging means comprises a spring means having one end in abutment with said valve member, an anchor, means for attaching said anchor to said fluid system so that said anchor is substantially stationary with respect to said valve seat, means for securing the other end of said spring means to said anchor and wherein said anchor is positioned within the fluid system in an area of relatively low fluid velocity with respect to the fluid velocity between said valve seat and valve member surfaces.

3. The invention as defined in claim 2 wherein said anchor is positioned upstream from said fluid port.

4. The invention as defined in claim 3 wherein said valve member comprises an enlarged head on which said valve member surface is formed and an elongated stem secured to and extending downstream from said valve head, said stem including an elongated recess in which said spring means is contained.

5. The invention as defined in claim 4 wherein said securing means comprises a spring retainer abutting against the end of the spring means most spaced from the valve head, an elongated rod secured at one end to the spring retainer and extending axially through the valve member stem and through an axial bore formed through the valve head, and means for attaching the other end of the rod to said anchor.

6. The invention as defined in claim 4 wherein said spring means is a helical compression spring.

7. The invention as defined in claim 3 wherein said anchor comprises at least three attached legs which abut against the valve seat.

8. The invention as defined in claim 4 wherein said valve member stem is substantially cylindrical in shape.

9. The invention as defined in claim 4 wherein said valve member stem is substantially frusto-conical in shape and in which the large diameter end of the stem is adjacent to the valve head.

10. The invention as defined in claim 1 wherein said valve seat comprises a second surface which flares outwardly from said port and toward said inlet passageway.

11. The invention as defined in claim 10 wherein said valve seat surfaces are both substantially frusto-conical in shape and form the fluid port at their intersection.

* * * * *